(12) United States Patent
Runciman et al.

(10) Patent No.: US 11,988,799 B2
(45) Date of Patent: May 21, 2024

(54) SYSTEM AND METHOD FOR LIQUIDS CORRECTION IN OIL AND GAS PREDICTIVE

(71) Applicant: RS Energy Group Topco, Inc., Calgary (CA)

(72) Inventors: Norman Runciman, Calgary (CA); Morgan Kwan, Calgary (CA); Jiarao Huang, Calgary (CA); Jianan Qu, Calgary (CA); Amanda Mackey, Calgary (CA)

(73) Assignee: RS Energy Group Topco, Inc., Alberta (CA)

( * ) Notice: Subject to any disclaimer, the term of this patent is extended or adjusted under 35 U.S.C. 154(b) by 341 days.

(21) Appl. No.: 16/899,890

(22) Filed: Jun. 12, 2020

(65) Prior Publication Data
US 2021/0223430 A1 Jul. 22, 2021

Related U.S. Application Data

(60) Provisional application No. 62/962,458, filed on Jan. 17, 2020.

(51) Int. Cl.
*G01V 3/18* (2006.01)
*E21B 47/003* (2012.01)
(Continued)

(52) U.S. Cl.
CPC .............. *G01V 3/18* (2013.01); *E21B 47/003* (2020.05); *E21B 47/12* (2013.01); *G06F 9/545* (2013.01); *G06F 17/18* (2013.01); *G06N 7/01* (2023.01)

(58) Field of Classification Search
CPC ......... G01V 3/18; E21B 47/003; E21B 47/12; E21B 43/00; G06F 9/545; G06F 17/18; G06N 7/005; G06N 20/10
See application file for complete search history.

(56) References Cited

U.S. PATENT DOCUMENTS

| | | | |
|---|---|---|---|
| 2016/0260181 A1 | 9/2016 | Singh | |
| 2018/0202264 A1 | 7/2018 | Sarduy et al. | |
| 2019/0361146 A1 | 11/2019 | Roth et al. | |

FOREIGN PATENT DOCUMENTS

| | | | | |
|---|---|---|---|---|
| CA | 2927840 C | * | 6/2020 | ............. E21B 47/00 |
| WO | WO-2017139271 A2 | * | 8/2017 | ......... E21B 41/0092 |

OTHER PUBLICATIONS

WO-2017139271-A2_Translated (Year: 2017).*

(Continued)

*Primary Examiner* — Manish S Shah
*Assistant Examiner* — Michael J Singletary
(74) *Attorney, Agent, or Firm* — DLA Piper LLP (US)

(57) ABSTRACT

A method and computing system is disclosed herein. The computing system receives, from a remote computing device, a set of production information for a plurality of plays from a region. The set of production information is directed to past production of the well. The computing system generates an input data set based on the set of production information. The input data set is generated by imputing missing production data to the production information and collapsing the data set into calendar days. The computing system fits one or more decline curves to the input data set. The computing system consolidates the one or more curves into a new data set. The computing system classifies the one or more curves by identifying a subset of wells in the new data set. The subset of wells includes a threshold amount of production information. The computing system delivers the classified results to the remote computing device.

17 Claims, 7 Drawing Sheets

(51) Int. Cl.
*E21B 47/12* (2012.01)
*G06F 9/54* (2006.01)
*G06F 17/18* (2006.01)
*G06N 7/01* (2023.01)

(56) References Cited

OTHER PUBLICATIONS

CA-2927840-C_Translated (Year: 2020).*
International Search Report and Written Opinion from corresponding PCT International Patent Application PCT/IB2020/055549 dated Oct. 2, 2020.
Extended European Search Report from corresponding European Patent Application No. 20914008.6 dated Jan. 22, 2024.
Examination Report from corresponding Canadian Patent Application No. 3,165,043 dated Jan. 30, 2024.

* cited by examiner

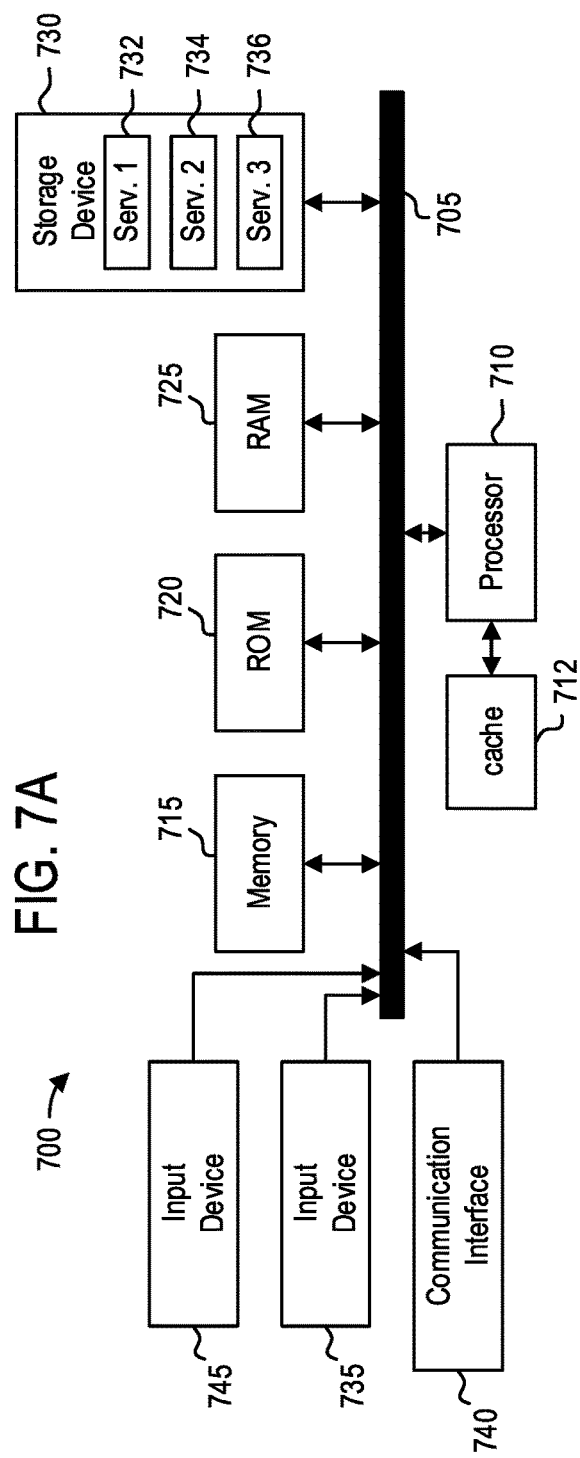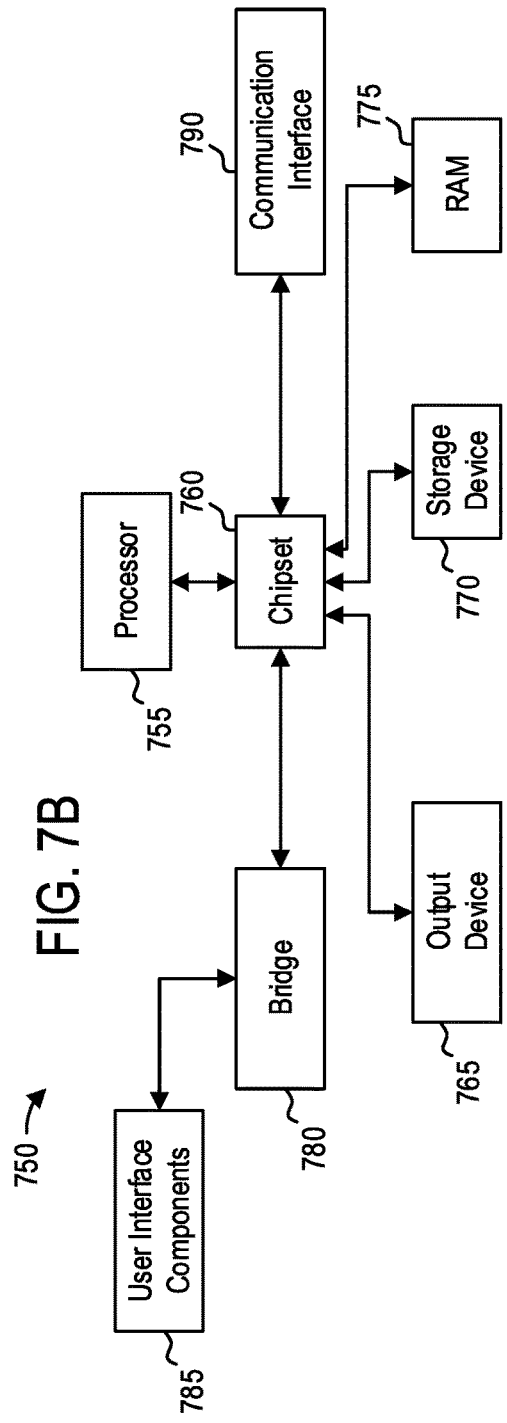

SYSTEM AND METHOD FOR LIQUIDS CORRECTION IN OIL AND GAS PREDICTIVE

FIELD OF DISCLOSURE

The present disclosure generally relates to a method and a system for liquids correction in oil and gas predictive analytics.

BACKGROUND

Decline curve analysis is a method used to predict future oil well or gas well production based on past production history. Current technology for performing decline curve analysis, however, is limited. For example, when production data is missing in conventional systems, those systems are unequipped for handling such gaps in data. As a result, the production projections are typically either incomplete or inaccurate due to their inability to address such data inconsistencies. As a result, conventional systems were limited to merely the data reported to them.

SUMMARY

Embodiments disclosed herein generally relate to a method and system for oil and gas predictive analytics. In some embodiments, a method is disclosed herein. A computing system receives, from a remote computing device, a set of production information for a plurality of plays from a region. The set of production information is directed to past production of the well. The computing system generates an input data set based on the set of production information. The input data set is generated by imputing missing production data to the production information and collapsing the data set into calendar days. The computing system fits one or more decline curves to the input data set. The computing system consolidates the one or more curves into a new data set. The computing system classifies the one or more curves by identifying a subset of wells in the new data set. The subset of wells includes a threshold amount of production information. The computing system delivers the classified results to the remote computing device.

In some embodiments, a system is disclosed herein. The system includes a processor and a memory. The memory has programming instructions stored thereon, which, when executed by the processor, performs an operation. The operation includes receiving, from a remote computing device, a set of production information for a plurality of plays from a region. The set of production information is directed to past production of the well. The operation further includes generating an input data set based on the set of production information. The input data set is generated by imputing missing production data to the production information and collapsing the data set into calendar days. The operation further includes fitting one or more decline curves to the input data set. The operation further includes consolidating the one or more curves into a new data sets. The operation further includes classifying the one or more curves by identifying a subset of wells in the new data set. The subset of wells includes a threshold amount of production information. The operation further includes delivering the classified results to the remote computing device.

In some embodiments, non-transitory computer readable medium is disclosed herein. The non-transitory computer readable medium has instructions stored thereon, which, when executed by a processor, cause the processor to perform a method. The method includes receiving, from a remote computing device, a set of production information for a plurality of plays from a region. The set of production information is directed to past production of the well. The method further includes generating, by a computing system, an input data set based on the set of production information. The input data set is generated by imputing missing production data to the production information and collapsing the data set into calendar days. The method further includes fitting, by the computing system, one or more decline curves to the input data set. The method further includes consolidating, by the computing system, the one or more curves into a new data set. The method further includes classifying, by the computing system, the one or more curves by identifying a subset of wells in the new data set. The subset of wells includes a threshold amount of production information. The method further includes delivering, by the computing system, the classified results to the remote computing device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 7A illustrates a system bus computing system architecture, according to example embodiments.

FIG. 7B illustrates a computer system having a chipset architecture that may represent at least a portion of management entity, according to example embodiments To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
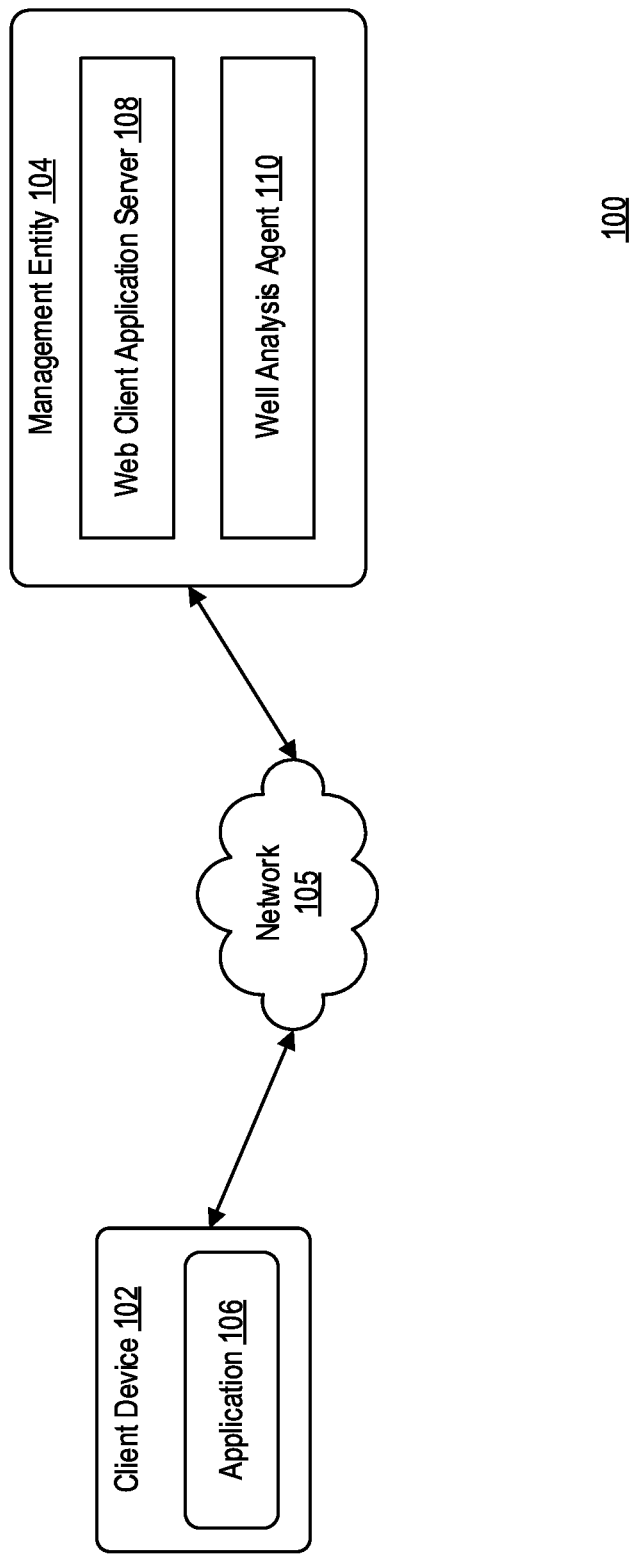
FIG. 1 is a block diagram illustrating an exemplary computing environment, according to one embodiment.

One or more techniques described herein are generally directed to a method and system for liquids correction. For some well basins (e.g., Montney, Duvernay, and Deep Basin Spirit River), there is a tendency for some of their liquids production on a producing month basis to be misreported. Generally, the true liquids volume should follow a similar decline profile as the well's gas stream, and are expected to be non-zero, but may be reported as zero barrels. For example, production from a well is expected to continuously be in two streams—gas and liquid. Therefore, if one stream has reported volumes while the other has zeros, there is evidence that a data correction is needed. When production data is reported, the liquids volume may be recombined into the gas stream, thus undermining the assessment of the value of the well's lifetime production. The misreporting of liquids production may happen to a well during any singular, consecutive, or irregular period of a well's lifecycle. For example, production data for a well could have been correctly reported for 15 out of 60 months of its life, whereas the missing months could be the first five months, the 35-40th months, and the last five months, or any combination of irregular order.

Previous approaches to correcting this issue estimated the likely liquid percentages for each month of the well's lifecycle. For example, previous techniques may have inferred the first month's liquids percentage differently form the remaining months. The first month's liquids percentage may have been estimated by interpolating trustable initial liquids percentages. The remaining months may be modeled by a set of differentiated digitized condensate gas ratio (CGR) declines.

The previous process may provide an estimate of the likely reported liquids value, but does not allow for an evaluation of their accuracy or predictability. Because it is impossible that for a given well with normal well-declining gas streams, the liquids stream may have non-zero, erratic months of production, where parts of their production may be recombined into gas while other months may be completely reported faithfully. The presently disclosed processed corrects months of liquids production that is already being reported truthfully and does not allow for the differentiation. Because producing days for a producing month are rarely full calendar days, yet the interpolated first month liquids and CGR decline are based on full calendar months, estimated values may be rarely comparable.

Further, the previous processes must be run twice a month, manually creating barriers for scale and room for human error. Still further, the previous processes recognize the range of error a mapped residual could carry when the reference points are far and sparse for a given well. It does not, however, introduce any uncertainty metrics.

The one or more techniques disclosed herein improve upon conventional processes by systematically identifying a set of perfectly reported wells, i.e., a "golden set," to evaluate the predictability and accuracy of all iterations and versions of the correction methodology. The present system may fit separate curves to oil and gas steams, treating zero-producing months as missing, and creates individualized confidence interval of likely declines to partition months of "good" versus "bad" production. For wells with enough well-behaved liquids production values, the present system may efficiently use as much information as possible from the well to impute missing or misreported liquids value. In some embodiments, the present system may generate three metrics to evaluate the degree of usability of a sequence of liquids data, length of consecutiveness, magnitude of consecutiveness, and frequency of consecutiveness. The consecutiveness may describe the segment of production with "good" production values, as evaluated by the confidence intervals of the curves. The three dimensions may be annotated as a single sequence of liquids production into a three-dimensional space from which further classification may operate.

In some embodiments, the present system may use state of the art geo-statistic methodologies, including Gaussian sequential simulation, to automate and improve existing interpolated map values and evaluate likely errors recursively. The process may recognize the uncertainty by creating a kernel density map given the population distribution of the control points. In other words, the denser the control points, the more accurate the initial liquids percentage may be interpolated.

FIG. 1 is a block diagram illustrating a computing environment 100, according to one embodiment. Computing environment 100 may include one or more client device 102 and a management entity 104 communicating via one or more networks 105. Client device 102 may be operated by a user. For example, client device 102 may be a mobile device, a tablet, a desktop computer, or any computing system having the capabilities described herein. Client device 102 may execute application 106. In some embodiments, application 106 may be a web browser accessing an application hosted on a remote web server. In some embodiments, application 106 may be installed on client device 102, and execute thereon. Although the below discussion is discussed in conjunction with the embodiment that the application is hosted remotely, those skilled in the art will readily understand that the below description may be applied to application 106 executing on client device 102. Client device 102 may be configured to execute application 106 to access content managed by web client application server 108 of management entity 104. Content displayed to user on client device 102 may be transmitted from web client application server 108 to client device 102, and subsequently processed by application 106 for display through a graphical user interface (GUI) of client device 102.

Client device 102 may communicate with management entity 104 to transmit data to management entity 104 for further analysis. Management entity 104 may include at least a web client application server 108 and well analysis agent 110. As recited above, client device 102 may be configured to execute application 106 to access content managed by and/or functionality of web client application server 108 of management entity 104. For example, application 106 may provide an interface between client device 102 and functionality of web client application server 108. In some embodiments, application 106 may allow user of client device 102 to input one or more parameters or files to be analyzed by well analysis agent 110. For example, application 106 may allow user of client device 102 to provide one or more parameters directed to oil and gas well analytics or one or more files directed to oil and gas well analytics.

Well analysis agent 110 may be configured to forecast future performance of oil and gas wells. For example, well analysis agent 110 may receive, as input, a set of data points associated with a performance history of a target well, and perform an analysis using the set of data points to forecast future performance of oil and gas wells. For example, well analysis agent 110 may utilize a non-linear least square approach to estimate an Arp's equation. Well analysis agent 110 may be formed from one or more software modules. The one or more software modules are collections of instructions stored on a media (e.g., memory of management entity 104) that represents a series of machine instructions (e.g., program code) that implements one or more algorithmic steps. Such machine instructions may be the actual computer code the processor of management entity 104 interprets to implement the instructions, or, alternatively, may be a higher-level coding of the instructions that are interpreted to obtain the actual computer code. The one or more software modules may also include one or more hardware components. One or more aspects of the algorithm may be performed by the hardware components (e.g., circuitry) itself, rather as a result of an instruction.

Figure 2:
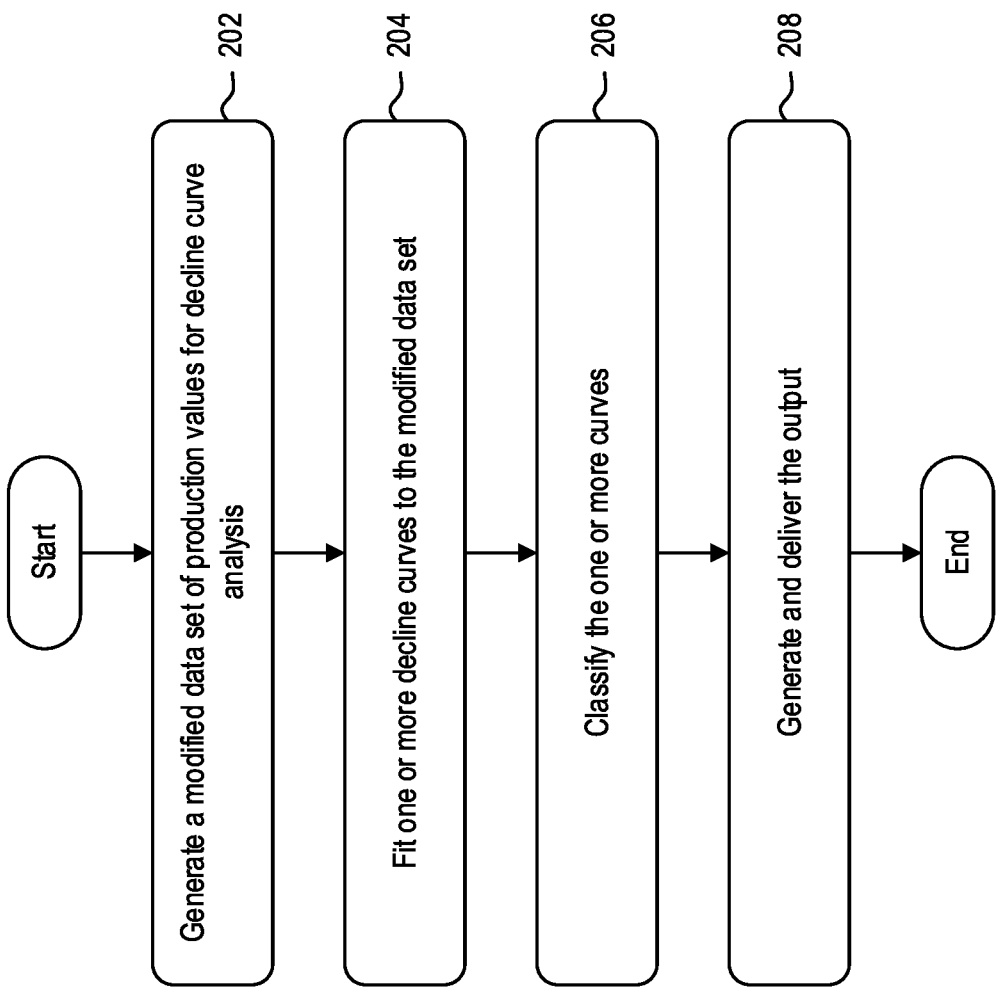
FIG. 2 is a flow diagram illustrating a method of forecasting future performance oil and gas wells, according to example embodiments.

FIG. 2 is a flow diagram illustrating a method 200 of forecasting future performance oil and gas wells, according to example embodiments. Method 200 may begin at step 202.

Figure 3:
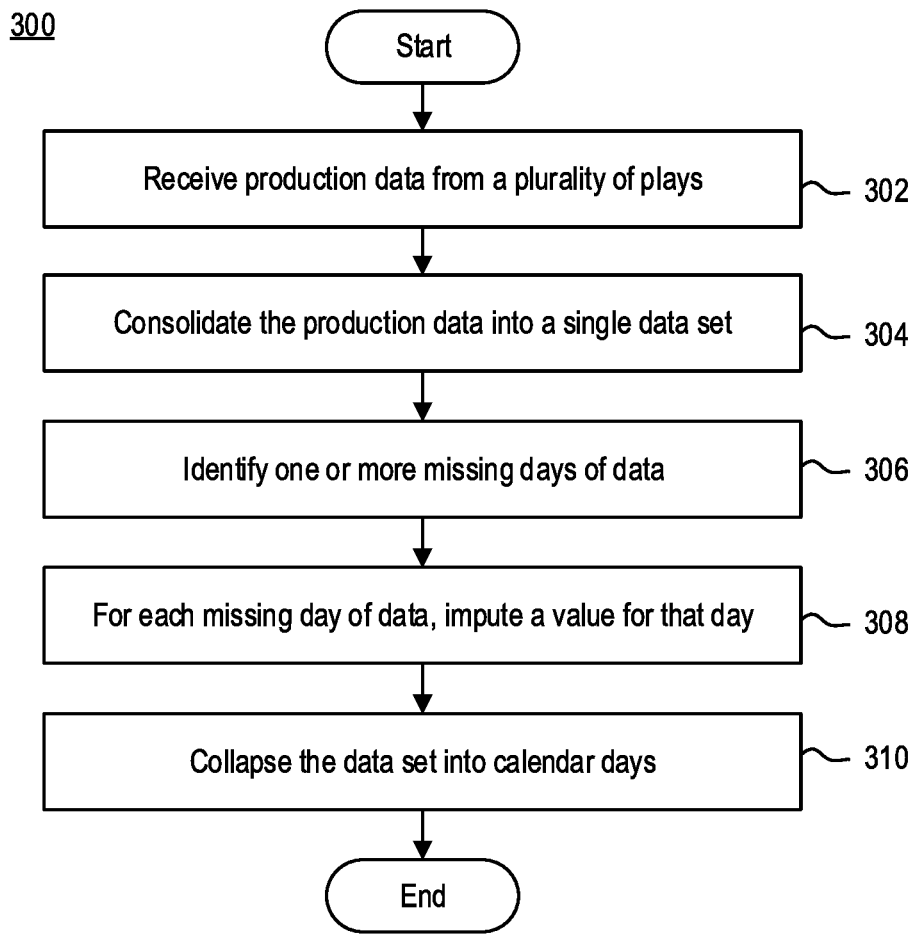
FIG. 3 is a flow diagram illustrating operations associated with a step from FIG. 2 in greater detail, according to example embodiments.

At step 202, well analysis agent 110 may prepare one or more data sets for analysis. FIG. 3 is a flow diagram illustrating operations associated with step 202 in greater detail, according to example embodiments.

At step 302, well analysis agent 110 may receive production data for a plurality of plays. In some embodiments, well analysis agent 110 may receive production data from one or more local files. In some embodiments, well analysis agent 110 may receive production data from one or more remote third party computers.

At step 304, well analysis agent 110 may consolidate the received production data into one production set. For example, well analysis agent 110 may consolidate the received production data for a plurality of plays into one production set so that the following processes are executed on all wells simultaneously.

At step 306, well analysis agent 110 may identify one or more missing day of data. For example, well analysis agent 110 may parse the consolidated production data and identify those days for which data is missing.

At step 308, for each identified missing day of production data, well analysis agent 110 may impute a value for that day. For example, given a day having missing production data, well analysis agent 110 may first mark the operator and month associated with the missing day of production data. Well analysis agent 110 may then collect production data from the consolidated data set having the same operator and month. Well analysis agent 110 may generate the average of the production data for the days having the same operator and month. In some embodiments, well analysis agent 110 may round up the average. Well analysis agent 110 may then impute missing days with this value.

In some embodiments, method 300 may include step 310. At step 310, well analysis agent 110 may generate a subsequent data set. In certain scenarios, the above operator-month average may not always be reliable, as this value may differ wildly across operators. For example, some operators may never release production data for a given day. In another example, a missing day may occur in a month where no other wells by the same operator ever produced. Accordingly, well analysis agent 110 may generate a first data set that include raw production data without the imputed producing days and a second data set that includes the imputed producing days.

At step 310, well analysis agent 110 may collapse the data set into calendar days. Generally, a drop in production may be sourced from a collapse in producing days. Accordingly, well analysis agent 110 may re-allocate all production into full calendar month, sequentially by first-production-months. Such reallocation may create a smoother decline profile to perform liquids corrections.

To collapse the data set, well analysis agent 110 may generate cumulative days given the number of producing days for each month. For example:

| Month | Jan | Feb | Mar | Apr | May | Jun | Jul | Aug | Sep | Oct | Nov | Dec |
|---|---|---|---|---|---|---|---|---|---|---|---|---|
| Raw Producing Days | 15 | 20 | 25 | 15 | 20 | 25 | 15 | 20 | 25 | 15 | 20 | 25 |
| First Prod_Date | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 |
| Calendar Days | 31 | 28 | 31 | 30 | 31 | 30 | 31 | 31 | 30 | 31 | 30 | 31 |
| Cumulative Days | 15 | 35 | 60 | 75 | 95 | 120 | 135 | 155 | 180 | 195 | 215 | 240 |

Given the number of cumulative days, well analysis agent 110 may generate a projection of producing days by adding the number of cumulative days to the first production date. For example, the number of producing days projected may be illustrated below.

| Month | Jan | Feb | Mar | Apr | May | Jun | Jul | Aug | Sep | Oct | Nov | Dec |
|---|---|---|---|---|---|---|---|---|---|---|---|---|
| Raw Producing Days | 15 | 20 | 25 | 15 | 20 | 25 | 15 | 20 | 25 | 15 | 20 | 25 |
| First Prod_Date | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 |
| Calendar Days | 31 | 28 | 31 | 30 | 31 | 30 | 31 | 31 | 30 | 31 | 30 | 31 |
| Cumulative Days | 15 | 35 | 60 | 75 | 95 | 120 | 135 | 155 | 180 | 195 | 215 | 240 |
| Producing Days Projected | Jan. 16, 2019 | Feb. 5, 2019 | Mar. 2, 2019 | Mar. 17, 2019 | Apr. 6, 2019 | May 1, 2019 | May 16, 2019 | Jun. 5, 2019 | Jun. 30, 2019 | Jul. 15, 2019 | Aug. 4, 2019 | Aug. 29, 2019 |

Given the projected number of producing days, well analysis agent 110 may identify the projected month, as well as the first of that month. For example, for April, the projected producing days is Mar. 17, 2019. Accordingly, well analysis agent 110 may identify the projected month as March and the first of the month as Mar. 1, 2019. For example:

| Month | Jan | Feb | Mar | Apr | May | Jun | Jul | Aug | Sep | Oct | Nov | Dec |
|---|---|---|---|---|---|---|---|---|---|---|---|---|
| Raw Producing Days | 15 | 20 | 25 | 15 | 20 | 25 | 15 | 20 | 25 | 15 | 20 | 25 |
| First Prod_Date | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 |
| Calendar Days | 31 | 28 | 31 | 30 | 31 | 30 | 31 | 31 | 30 | 31 | 30 | 31 |
| Cumulative Days | 15 | 35 | 60 | 75 | 95 | 120 | 135 | 155 | 180 | 195 | 215 | 240 |
| Producing Days Projected | Jan. 16, 2019 | Feb. 5, 2019 | Mar. 2, 2019 | Mar. 17, 2019 | Apr. 6, 2019 | May 1, 2019 | May 16, 2019 | Jun. 5, 2019 | Jun. 30, 2019 | Jul. 15, 2019 | Aug. 4, 2019 | Aug. 29, 2019 |
| Month Projected | Jan | Feb | Mar | Mar | Apr | May | May | Jun | Jun | Jul | Aug | Aug |
| First of the Month | Jan. 1, 2019 | Feb. 1, 2019 | Mar. 1, 2019 | Mar. 1, 2019 | Apr. 1, 2019 | May 1, 2019 | May 1, 2019 | Jun. 1, 2019 | Jun. 1, 2019 | Jul. 1, 2019 | Aug. 1, 2019 | Aug. 1, 2019 |

Given the first of the month and the projected number of producing days, well analysis agent 110 may generate the number of producing days projected from the first of the month. For example, January has a first of the month as Jan. 1, 2019 and a number of projected producing days as Jan. 16, 2019. Accordingly, the number of producing days projected from the first of the month is 15. For example:

| Month | Jan | Feb | Mar | Apr | May | Jun | Jul | Aug | Sep | Oct | Nov | Dec |
|---|---|---|---|---|---|---|---|---|---|---|---|---|
| Raw Producing Days | 15 | 20 | 25 | 15 | 20 | 25 | 15 | 20 | 25 | 15 | 20 | 25 |
| First Prod_Date | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 |
| Calendar Days | 31 | 28 | 31 | 30 | 31 | 30 | 31 | 31 | 30 | 31 | 30 | 31 |
| Cumulative Days | 15 | 35 | 60 | 75 | 95 | 120 | 135 | 155 | 180 | 195 | 215 | 240 |
| Producing Days Projected | Jan. 16, 2019 | Feb. 5, 2019 | Mar. 2, 2019 | Mar. 17, 2019 | Apr. 6, 2019 | May 1, 2019 | May 16, 2019 | Jun. 5, 2019 | Jun. 30, 2019 | Jul. 15, 2019 | Aug. 4, 2019 | Aug. 29, 2019 |
| Month Projected | Jan | Feb | Mar | Mar | Apr | May | May | Jun | Jun | Jul | Aug | Aug |
| First of the Month | Jan. 1, 2019 | Feb. 1, 2019 | Mar. 1, 2019 | Mar. 1, 2019 | Apr. 1, 2019 | May 1, 2019 | May 1, 2019 | Jun. 1, 2019 | Jun. 1, 2019 | Jul. 1, 2019 | Aug. 1, 2019 | Aug. 1, 2019 |
| # Producing Days from First of Month | 15 | 4 | 1 | 16 | 5 | 0 | 15 | 4 | 29 | 14 | 3 | 28 |

Well analysis agent 110 may then generate the number of days given to a respective month. For example, well analysis agent 110 may generate the number of days given to the month by:

Days Given to Month=min(Producing days,#Producing Days from First of Month)

This yields:

| Month | Jan | Feb | Mar | Apr | May | Jun | Jul | Aug | Sep | Oct | Nov | Dec |
|---|---|---|---|---|---|---|---|---|---|---|---|---|
| Raw Producing Days | 15 | 20 | 25 | 15 | 20 | 25 | 15 | 20 | 25 | 15 | 20 | 25 |
| First Prod_Date | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 |

-continued

| | | | | | | | | | | | |
|---|---|---|---|---|---|---|---|---|---|---|---|
| Calendar Days | 31 | 28 | 31 | 30 | 31 | 30 | 31 | 31 | 30 | 31 | 30 | 31 |
| Cumulative Days | 15 | 35 | 60 | 75 | 95 | 120 | 135 | 155 | 180 | 195 | 215 | 240 |
| Producing Days Projected | Jan. 16, 2019 | Feb. 5, 2019 | Mar. 2, 2019 | Mar. 17, 2019 | Apr. 6, 2019 | May 1, 2019 | May 16, 2019 | Jun. 5, 2019 | Jun. 30, 2019 | Jul. 15, 2019 | Aug. 4, 2019 | Aug. 29, 2019 |
| Month Projected | Jan | Feb | Mar | Mar | Apr | May | May | Jun | Jun | Jul | Aug | Aug |
| First of the Month | Jan. 1, 2019 | Feb. 1, 2019 | Mar. 1, 2019 | Mar. 1, 2019 | Apr. 1, 2019 | May 1, 2019 | May 1, 2019 | Jun. 1, 2019 | Jun. 1, 2019 | Jul. 1, 2019 | Aug. 1, 2019 | Aug. 1, 2019 |
| # Producing Days from First of Month | 15 | 4 | 1 | 16 | 5 | 0 | 15 | 4 | 29 | 14 | 3 | 28 |
| # Days Given to Month | 15 | 4 | 1 | 15 | 5 | 0 | 15 | 4 | 25 | 14 | 3 | 25 |

Given the number of days given to the month, well analysis agent 110 may generate the number of days given to the previous month by:

Days Prev. Month = Producing Days − #Days Given to Month

This yields:

| Month | Jan | Feb | Mar | Apr | May | Jun | Jul | Aug | Sep | Oct | Nov | Dec |
|---|---|---|---|---|---|---|---|---|---|---|---|---|
| Raw Producing Days | 15 | 20 | 25 | 15 | 20 | 25 | 15 | 20 | 25 | 15 | 20 | 25 |
| First Prod_Date | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 | Jan. 1, 2019 |
| Calendar Days | 31 | 28 | 31 | 30 | 31 | 30 | 31 | 31 | 30 | 31 | 30 | 31 |
| Cumulative Days | 15 | 35 | 60 | 75 | 95 | 120 | 135 | 155 | 180 | 195 | 215 | 240 |
| Producing Days Projected | Jan. 16, 2019 | Feb. 5, 2019 | Mar. 2, 2019 | Mar. 17, 2019 | Apr. 6, 2019 | May 1, 2019 | May 16, 2019 | Jun. 5, 2019 | Jun. 30, 2019 | Jul. 15, 2019 | Aug. 4, 2019 | Aug. 29, 2019 |
| Month Projected | Jan | Feb | Mar | Mar | Apr | May | May | Jun | Jun | Jul | Aug | Aug |
| First of the Month | Jan. 1, 2019 | Feb. 1, 2019 | Mar. 1, 2019 | Mar. 1, 2019 | Apr. 1, 2019 | May 1, 2019 | May 1, 2019 | Jun. 1, 2019 | Jun. 1, 2019 | Jul. 1, 2019 | Aug. 1, 2019 | Aug. 1, 2019 |
| # Producing Days from First of Month | 15 | 4 | 1 | 16 | 5 | 0 | 15 | 4 | 29 | 14 | 3 | 28 |
| # Days Given to Month | 15 | 4 | 1 | 15 | 5 | 0 | 15 | 4 | 25 | 14 | 3 | 25 |
| # Days Given to Prev. Month | 0 | 16 | 24 | 0 | 15 | 25 | 0 | 16 | 0 | 1 | 17 | 0 |

Well analysis agent 110 may use this information to determine the gas production allocated to a respective month. For example, given the number of days given to a respective month, the number of producing days, and the gas production, well analysis agent 110 may determine the gas production allocated to a given month by:

$$\text{Gas Allocated to This Month} = \frac{\text{\# of Days Given to Month}}{\text{Producing Days}} * \text{Gas Production}$$

This yields:

| Month | Jan | Feb | Mar | Apr | May | Jun | Jul | Aug | Sep | Oct | Nov | Dec |
|---|---|---|---|---|---|---|---|---|---|---|---|---|
| Raw Producing Days | 15 | 20 | 25 | 15 | 20 | 25 | 15 | 20 | 25 | 15 | 20 | 25 |
| # Days Given to Month | 15 | 4 | 1 | 15 | 5 | 0 | 15 | 4 | 25 | 14 | 3 | 25 |
| Gas Production | 3210 | 4200 | 5140 | 3060 | 3990 | 4940 | 2940 | 3870 | 4790 | 2880 | 3840 | 4790 |
| Gas Allocated to Month | 3210 | 840 | 205.6 | 3060 | 997.5 | 0 | 2940 | 774 | 4790 | 2688 | 576 | 4790 |

Well analysis agent 110 may also determine the gas allocated to the next month. For example, given the number of days given to the next month, the producing days, and the gas production, well analysis agent 110 may generate the gas allocated to the next month, by:

$$\text{Gas Allocated to Next Month} = \frac{\text{\# of Days Given to Next Month}}{\text{Producing Days}} * \text{Gas Production}$$

This yields:

| Month | Jan | Feb | Mar | Apr | May | Jun | Jul | Aug | Sep | Oct | Nov | Dec |
|---|---|---|---|---|---|---|---|---|---|---|---|---|
| Raw Producing Days | 15 | 20 | 25 | 15 | 20 | 25 | 15 | 20 | 25 | 15 | 20 | 25 |
| # Days Given to Month | 15 | 4 | 1 | 15 | 5 | 0 | 15 | 4 | 25 | 14 | 3 | 25 |
| # Days Given to Prev. Month | 0 | 16 | 24 | 0 | 15 | 25 | 0 | 16 | 0 | 1 | 17 | 0 |
| Gas Production | 3210 | 4200 | 5140 | 3060 | 3990 | 4940 | 2940 | 3870 | 4790 | 2880 | 3840 | 4790 |
| Gas Allocated to Month | 3210 | 840 | 205.6 | 3060 | 997.5 | 0 | 2940 | 774 | 4790 | 2688 | 576 | 4790 |
| Gas Allocated to Next Month | 0 | 3360 | 4934.4 | 0 | 2992.5 | 4940 | 0 | 3096 | 0 | 192 | 3264 | 0 |

This may then provide the date projected for the current month and the data projected for the last month. For example,

| Month | Jan | Feb | Mar | Apr | May | Jun | Jul | Aug | Sep | Oct | Nov | Dec |
|---|---|---|---|---|---|---|---|---|---|---|---|---|
| Raw Producing Days | 15 | 20 | 25 | 15 | 20 | 25 | 15 | 20 | 25 | 15 | 20 | 25 |
| # Days Given to Month | 15 | 4 | 1 | 15 | 5 | 0 | 15 | 4 | 25 | 14 | 3 | 25 |
| # Days Given to Prev. Month | 0 | 16 | 24 | 0 | 15 | 25 | 0 | 16 | 0 | 1 | 17 | 0 |
| Gas Production | 3210 | 4200 | 5140 | 3060 | 3990 | 4940 | 2940 | 3870 | 4790 | 2880 | 3840 | 4790 |
| Gas Allocated to Month | 3210 | 840 | 205.6 | 3060 | 997.5 | 0 | 2940 | 774 | 4790 | 2688 | 576 | 4790 |
| Gas Allocated to Next Month | 0 | 3360 | 4934.4 | 0 | 2992.5 | 4940 | 0 | 3096 | 0 | 192 | 3264 | 0 |
| Proj. this Month | Jan. 1, 2019 | Feb. 1, 2019 | Mar. 1, 2019 | Mar. 1, 2019 | Apr. 1, 2019 | May 1, 2019 | May 1, 2019 | Jun. 1, 2019 | Jun. 1, 2019 | Jul. 1, 2019 | Aug. 1, 2019 | Aug. 1, 2019 |
| Proj. last Month | Dec. 1, 2019 | Jan. 1, 2019 | Feb. 1, 2019 | Mar. 1, 2019 | Mar. 1, 2019 | Apr. 1, 2019 | May 1, 2019 | May 1, 2019 | Jun. 1, 2019 | Jun. 1, 2019 | Jul. 1, 2019 | Aug. 1, 2019 |

Well analysis agent 110 may then parse through the Projected This Month and Projected Last Month data to identify and remove duplicate values. For example:

| Projected This Month | Projected Last Month |
|---|---|
| 2019 Jan. 1 | 2018 Dec. 1 |
| 2019 Feb. 1 | 2019 Jan. 1 |
| 2019 Mar. 1 | 2019 Feb. 1 |
| 2019 Mar. 1 | 2019 Feb. 1 |
| 2019 Apr. 1 | 2019 Mar. 1 |
| 2019 May 1 | 2019 Apr. 1 |
| 2019 May 1 | 2019 Apr. 1 |
| 2019 Jun. 1 | 2019 May 1 |
| 2019 Jun. 1 | 2019 May 1 |
| 2019 Jul. 1 | 2019 Jun. 1 |
| 2019 Aug. 1 | 2019 Jul. 1 |
| 2019 Aug. 1 | 2019 Jul. 1 |

Well analysis agent 110 may remove duplicates from the Projected This Month column, and duplicate the values to yield corresponding last month values. This yields:

| Projected This Month | Projected Last Month |
|---|---|
| 2019 Jan. 1 | 2019 Jan. 1 |
| 2019 Feb. 1 | 2019 Feb. 1 |
| 2019 Mar. 1 | 2019 Mar. 1 |
| 2019 Apr. 1 | 2019 Apr. 1 |
| 2019 May 1 | 2019 May 1 |
| 2019 Jun. 1 | 2019 Jun. 1 |
| 2019 Jul. 1 | 2019 Jul. 1 |
| 2019 Aug. 1 | 2019 Aug. 1 |

Well analysis agent 110 may then allocate, to each month, a gas total by summing those values for each corresponding month. Well analysis agent 110 may then allocate, to each month, a gas total for the next month by summing those values for each corresponding month. Well analysis agent 110 uses these values to generate total gas production by summing them. For example:

| Projected This Month | Projected Last Month | Total Gas Allocated | Total Gas Allocated Next Month | Total Gas Production |
|---|---|---|---|---|
| 2019 Jan. 1 | 2019 Jan. 1 | 3210 | 3360 | 6570 |
| 2019 Feb. 1 | 2019 Feb. 1 | 840 | 4934.4 | 5774 |
| 2019 Mar. 1 | 2019 Mar. 1 | 3265.6 | 2992.5 | 6258 |
| 2019 Apr. 1 | 2019 Apr. 1 | 997.5 | 4940 | 5938 |
| 2019 May 1 | 2019 May 1 | 2940 | 3096 | 6036 |
| 2019 Jun. 1 | 2019 Jun. 1 | 5564 | 192 | 5756 |
| 2019 Jul. 1 | 2019 Jul. 1 | 2688 | 3264 | 5952 |
| 2019 Aug. 1 | 2019 Aug. 1 | 5366 | 0 | 5366 |

Figure 4:
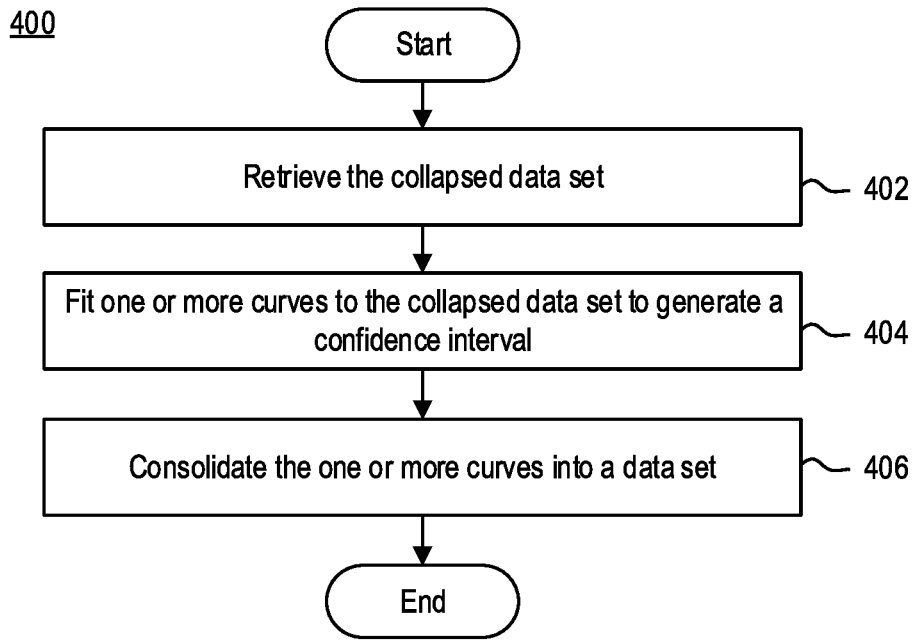
FIG. 4 is a flow diagram illustrating operations associated with a step from FIG. 2 in greater detail, according to example embodiments.

Referring back to FIG. 2, at step 204, well analysis agent 110 may fit one or more curves to the generated data set. FIG. 4 is a flow diagram illustrating operations associated with step 204 in greater detail, according to example embodiments.

At step 402, well analysis agent 110 may retrieve the generated data set. In some embodiments, the data set may be pre-generated ahead of time and stored in a database associated with management entity 104.

At step 404, well analysis agent 110 may then fit one or more curve to the allocated data. For example, well analysis agent 110 may be configured to fit one or more curves to the collapsed data set to create a confidence interval. Fitting curves to allocated production data may allow well analysis agent 110 to investigate the trend of behavior of a well. In some embodiments, well analysis agent 110 may standardize the trend by the allocated days to smooth any drops in production.

In conventional systems, when users tried to correct a well, they often ended up correcting the entire liquids stream, even though only certain months of the well ended up reporting liquids. The present approach improves upon conventional approaches by creating a confidence interval. For example, well analysis agent 110 may identify those portions of the production data that requires correction by looking at the curve applied to the production data.

For example, well analysis agent 110 may generate one or more metrics related to daily values for gas and liquid production. In some embodiments, well analysis agent 110 may generate a daily liquids value based on allocated liquids and allocated producing days. For example:

$$\text{Liquids Daily} = \frac{\text{Allocated Liquids}}{\text{Allocated Producing Days}}$$

In some embodiments, well analysis agent 110 may generate a daily gas value based on allocated gas and allocated producing days. For example:

$$\text{Gas Daily} = \frac{\text{Allocated Gas}}{\text{Allocated Producing Days}}$$

Well analysis agent 110 may then generate a confidence range for the curves. For example, well analysis agent 110 may compute 10th, 25th, 50th, 75th, and 90th percentiles for the entire curve. In some embodiments, the percentiles are generated inclusive of the 0 values. Well analysis agent 110 may generate five different raw production data, each with production that meets the percentile cutoff. In some embodiments, well analysis agent 110 may generate one additional curve with non-zero production values. Well analysis agent 110 may then fit a curve to each of the raw data sets. For example, well analysis agent 110 may fit an Arp's curve to each selection of raw data.

Figure 6:
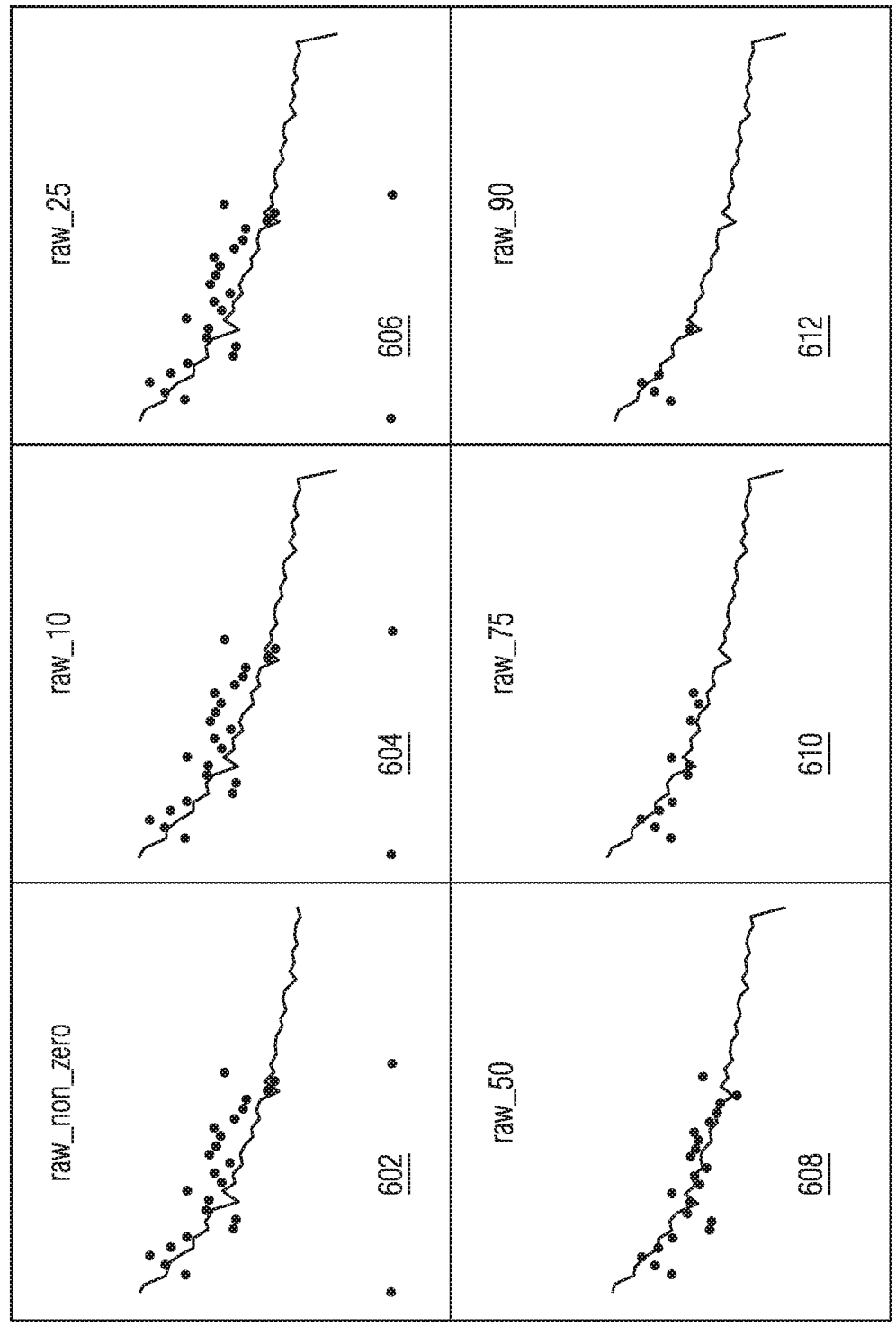
FIG. 6 is a block diagram illustrating one or more graphs, according to example embodiments.

FIG. 6 is a block diagram 600 illustrating one or more graphs 602-612, according to example embodiments. Graph 602 may correspond to a curve fit to raw non-zero production values. Graph 604 may correspond to a curve fit to raw 10th percentile production values. Graph 606 may correspond to a curve fit to raw 25th percentile production values. Graph 608 may correspond to a curve fit to raw 50th percentile production values. Graph 610 may correspond to a curve fit to raw 75th percentile production values. Graph 612 may correspond to a curve fit to raw 90th percentile production values.

Referring back to FIG. 4, after fitting a curve to each raw data set, well analysis agent 110 may then store parameters and evaluate metrics from each raw data set. For example, well analysis agent 110 may store absolute values of peak, $q_i$, b-factor, and decline values, variances of $q_i$, b-factor, and decline values, and evaluation metrics of R-square and mean-square error (MSE) values.

At step 406, well analysis agent 110 may consolidate the generated curves. For example, the data points that define the curves may be compiled and saved, so that well analysis agent 110 can use the shape of the curves to fill and estimate missing data.

Figure 5:
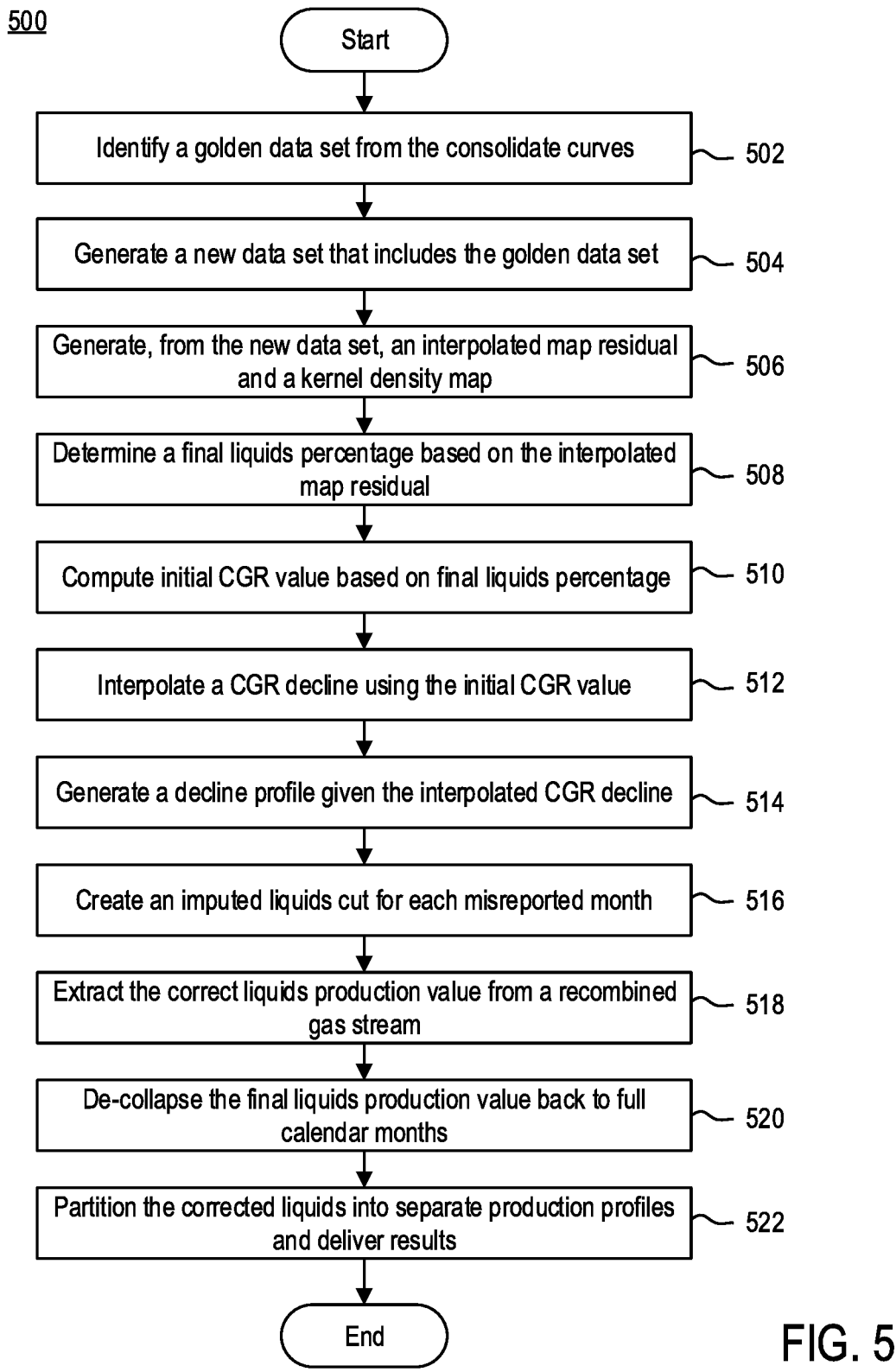
FIG. 5 is a flow diagram illustrating operations associated with a step from FIG. 2 in greater detail, according to example embodiments.

Referring back to FIG. 2, at step 206, well analysis agent 110 may classify each of the one or more curves. FIG. 5 is a block diagram illustrating operations associated with step 206 in greater detail, according to example embodiments.

At step 502, well analysis agent 110 may generate a golden data set from the consolidated curve data. Well analysis agent 110 may parse the consolidated curve data to identify those wells that do not need corrections. From the wells that do not need correction, well analysis agent 110 may identify those wells that include both gas and oil production values. In some embodiments, well analysis agent 110 may remove those well that do not include enough data. For example, well analysis agent 110 may remove those wells that have less than 15 months of data. In some embodiments, well analysis agent 110 may also remove those wells that have less than 95% of their data being non-zero. From these wells, well analysis agent 110 may parse their corresponding decline curves to identify those wells with a threshold $R^2$ value. For example, well analysis agent 110 may identify those wells with an $R^2$ value less than about 0.3. The resulting set of wells may be referred to as a "golden data set." In other words, well analysis agent 110 may identify the golden data set based on, for example, a combination of $R^2$ values, variance, and standard error of the curves fitted to both gas and oil simultaneously.

At step 504, well analysis agent 110 may generate a new data set that includes the golden data set. For example, well analysis agent 110 may marry the golden data set into control points population. For example, the control points population is a list of well-by-well liquids percentages sourced from production tests, gas analysis and operator disclosure. The control points population, including the golden data set, may be used to generate a map of liquids percentages.

At step 506, well analysis agent 110 may generate, from the new data set, an interpolated map residual and a kernel density map. An interpolated map residual may be generated by using a minimum curvature interpolation method with the bottom hole latitude and longitude of each well. The interpolated map residual may represent the liquids percentage. A kernel density heat map may be generated by calculating the data density within a specific region using the bottom hole latitude and longitude locations of each of the control points.

At step 508, well analysis agent 110 may determine a final liquids percentage based on the interpolated map residual. To determine a final liquids percentage, well analysis agent 110 may compare the interpolated mapped residual (i.e., the liquids percentage) to actual raw liquids percentage. For example, well analysis agent 110 may compare the interpolated mapped residual on a percent difference basis.

At step 510, well analysis agent 110 may generate an initial CGR based on the final liquids percentage. If the raw allocated residuals were not altered by the residual comparisons, well analysis agent 110 may use the raw allocated liquids and gas production values to compute the initial CGR. In some embodiments, the initial CGR may be the first month's ratio of:

$$\text{Initial } CGR = \frac{\text{allocated liquids}}{\text{allocated gas}} * 1000$$

If, for example, the allocated gas is 0, then well analysis agent 110 may check to see if there is a gas curve that is fitted. If that well has at least 20 months of data, then well analysis agent 110 may use that allocated gas values.

At step 512, well analysis agent 110 may interpolate a CGR decline using the initial CGR value. For example, well analysis agent 110 may interpolate the CGR decline from digitized disclosed decline profiles using the initial CGR value. Production streams with a higher liquid's percentage may experience a steeper decline on the liquids stream. In the absence of consistently reported liquid production numbers, well analysis agent 110 may interpolate a decline profile for the liquids stream using digitized operator disclosed CGR curves. Digitized operator disclosed CGR curves are four distinct profiles showing CGR through time, characterized by the initial CGR value; the higher the CGR, the steeper the decline profile.

At step 514, well analysis agent 110 may generate a liquids percentage decline. For example, given the interpolated CGR curve, well analysis agent 110 may generate a decline profile by normalizing the CGR curve from the first month to degenerate the decline profile. Well analysis agent 110 may multiply the decline profile by the final initial liquids cut to create the liquids percentage decline for the well as a possible imputed value for missing months of liquids production.

At step 516, well analysis agent 110 may create an imputed liquid cut for each misreported month. Using the length of consecutive months of good production data, along with its magnitude and number of consecutiveness, well analysis agent 110 may identify wells for which the liquids production is reliable enough to estimate the liquid cut for the missing month. If there is enough month by month reported liquids data, well analysis agent 110 can generate a decline curve. The generated decline curve may act as a proxy for any months with missing liquids production volumes. In some embodiments, if the imputed value is missing, well analysis agent 110 may default to the imputed value from step 514 to create a final imputed liquids percentage.

At step 518, well analysis agent 110 may extract the correct liquids production value from a recombined gas stream. For example, using the imputed liquids percentage, well analysis agent 110 may extract out the correct liquids production from a recombine gas stream. In the scenario where a well's month by month production requires correction, for example, the production may be reported only as gas volumes. Accordingly, in this scenario, the correction process would allocate the missing liquids volumes. In order to honor the total volume of production being produced, any volumes being allocated as liquids also need to be pulled out of the gas stream. This conversion may be performed using a molar equivalency.

At step 520, well analysis agent 110 may de-collapse the final liquids production value back to full calendar months. In some embodiments, the format of the ingested raw data is on a calendar day basis; total volume of production per calendar month. For example, as provided above, the production data may be collapsed to account for downtime and to make the data usable for fitting curves to. After the correction process, well analysis agent 110 may re-allocate the production data back to a calendar basis so that every calendar month has a total volume of corrected production.

At step 522, well analysis agent 110 may partition the corrected liquids into separate production profiles and deliver the results to the end user. For example, well analysis agent may partition to corrected liquids into separate production profiles based on play-province.

Referring back to FIG. 2, at step 208, well analysis agent 110 may deliver the results to client device 102. In some embodiments, well analysis agent 110 may notify client device 102 that one or more APIs are available for viewing the results via application 106. In some embodiments, well analysis agent 110 may deliver the results to client device 102 via application 106.

FIG. 7A illustrates a system bus computing system architecture 700, according to example embodiments. System 700 may be representative of at least a portion of management entity 104. One or more components of system 700 may be in electrical communication with each other using a bus 705. System 700 may include a processing unit (CPU or processor) 710 and a system bus 705 that couples various system components including the system memory 715, such as read only memory (ROM) 720 and random access memory (RAM) 725, to processor 710. System 700 may include a cache of high-speed memory connected directly with, in close proximity to, or integrated as part of processor 710. System 700 may copy data from memory 715 and/or storage device 730 to cache 712 for quick access by processor 710. In this way, cache 712 may provide a performance boost that avoids processor 710 delays while waiting for data. These and other modules may control or be configured to control processor 710 to perform various actions. Other system memory 715 may be available for use as well. Memory 715 may include multiple different types of memory with different performance characteristics. Processor 710 may include any general purpose processor and a hardware module or software module, such as service 1 732, service 2 734, and service 3 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the computing device 700, an input device 745 may represent any number of input mechanisms, such as a microphone for speech, a touch-sensitive screen for gesture or graphical input, keyboard, mouse, motion input, speech and so forth. An output device 735 may also be one or more of a number of output mechanisms known to those of skill in the art. In some instances, multimodal systems may enable a user to provide multiple types of input to communicate with computing device 700. Communications interface 740 may generally govern and manage the user input and system output. There is no restriction on operating on any particular hardware arrangement and therefore the basic features here may easily be substituted for improved hardware or firmware arrangements as they are developed.

Storage device 730 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 may include services 732, 734, and 736 for controlling the processor 710. Other hardware or software modules are contemplated. Storage device 730 may be connected to system bus 705. In one aspect, a hardware module that performs a particular function may include the software component stored in a computer-readable medium in connection with the necessary hardware components, such as processor 710, bus 705, display 735, and so forth, to carry out the function.

FIG. 7B illustrates a computer system 750 having a chipset architecture that may represent at least a portion of management entity 104, according to example embodiments. Computer system 750 may be an example of computer hardware, software, and firmware that may be used to implement the disclosed technology. System 750 may include a processor 755, representative of any number of physically and/or logically distinct resources capable of executing software, firmware, and hardware configured to perform identified computations. Processor 755 may communicate with a chipset 760 that may control input to and output from processor 755. In this example, chipset 760 outputs information to output 765, such as a display, and may read and write information to storage device 770, which may include magnetic media, and solid state media, for example. Chipset 760 may also read data from and write data to RAM 775. A bridge 780 for interfacing with a variety of user interface components 785 may be provided for interfacing with chipset 760. Such user interface components 785 may include a keyboard, a microphone, touch detection and processing circuitry, a pointing device, such as a mouse, and so on. In general, inputs to system 750 may come from any of a variety of sources, machine generated and/or human generated.

Chipset 760 may also interface with one or more communication interfaces 790 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 755 analyzing data stored in storage 770 or 775. Further, the machine may receive inputs from a user through user interface components 785 and execute appropriate functions, such as browsing functions by interpreting these inputs using processor 755.

It may be appreciated that example systems 700 and 750 may have more than one processor 710 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
    receiving, from a remote computing device, a set of production information for a plurality of plays from a region, the set of production information directed to past production of a plurality of wells;
    generating, by a computing system, an input data set based on the set of production information;
    identifying, by the computing system, a first portion of the input data set comprising a first plurality of wells that requires correction by fitting one or more decline curves to the input data set, wherein each well of the first plurality of wells comprises a month of production data that misreported;
    consolidating, by the computing system, the one or more decline curves into a new data set;
    classifying, by the computing system, the one or more decline curves by identifying a second plurality of wells in the new data set, the second plurality of wells comprising a threshold amount of production information, the classifying comprising:
        identifying a second portion of the input data set that does not require correction, the second portion of the input data set comprising the second plurality of wells,
        generating an interpolated map residual from the new data set based on control points of the second plurality of wells,
        generating a kernel density heat map from the new data set, the kernel density heat map representing a density of the production data within a region of the second plurality of wells based on the control points,
        generating a decline profile for the set of production information based on the interpolated map residual and the kernel density heat map,
        imputing values for each month of the production data that misreported based on the decline profile, and
        classifying the one or more decline curves based on the imputed values;
    forecasting, by the computing system, future oil or gas production of the plurality of wells based on the classified one or more decline curves; and
    delivering, by the computing system, the forecasted future oil or gas production of the plurality of wells to the remote computing device.

2. The method of claim 1, wherein generating, by the computing system, the input data set comprises:
    consolidating the set of production information for the plurality of plays into a single data set.

3. The method of claim 2, further comprising:
    identifying one or more missing days of data in the single data set;
    generating a production value for each of the identified one or more missing days of data; and
    imputing each production value in each respective missing day of data.

4. The method of claim 1, wherein fitting, by the computing system, the one or more decline curves to the input data set comprises:
    generating a confidence interval to identify the second portion of the input data set that exceeds the threshold amount of production value.

5. The method of claim 1, identifying the second plurality of wells in the new data set comprises:
    identifying in the new data set one or more values that comprise an r-squared value, a variance value, and a standard error value.

6. The method of claim 1, wherein classifying, by the computing system, the one or more decline curves comprises:
    partitioning the classified one or more decline curves into separate production profiles based on a respective play.

7. A system, comprising:
a processor; and
a memory having programming instructions stored thereon, which, when executed by the processor, performs an operation comprising:
receiving, from a remote computing device, a set of production information for a plurality of plays from a region, the set of production information directed to past production of a plurality of wells;
generating an input data set based on the set of production information;
identifying a first portion of the input data set comprising a first plurality of wells that requires correction by fitting one or more decline curves to the input data set, wherein each well of the first plurality of wells comprises a month of production data that misreported;
consolidating the one or more decline curves into a new data set;
classifying the one or more decline curves by identifying a second plurality of wells in the new data set, the second plurality of wells comprising a threshold amount of production information, the classifying comprising:
identifying a second portion of the input data set that does not require correction, the second portion of the input data set comprising the second plurality of wells,
generating an interpolated map residual from the new data set based on control points of the second plurality of wells,
generating a kernel density heat map from the new data set, the kernel density heat map representing a density of the production data within a region of the second plurality of wells based on the control points,
generating a decline profile for the set of production information based on the interpolated map residual and the kernel density heat map,
imputing values for each month of the production data that misreported based on the decline profile, and
classifying the one or more decline curves based on the imputed values; and
forecasting future oil or gas production of the plurality of wells based on the classified one or more decline curves; and
delivering the forecasted future oil or gas production of the plurality of wells to the remote computing device.

8. The system of claim 7, wherein generating the input data set comprises:
consolidating the set of production information for the plurality of plays into a single data set.

9. The system of claim 8, further comprising:
identifying one or more missing days of data in the single data set;
generating a production value for each of the identified one or more missing days of data; and
imputing each production value in each respective missing day of data.

10. The system of claim 7, wherein fitting the one or more decline curves to the input data set comprises:
generating a confidence interval to identify the second portion of the input data set that exceeds the threshold amount of production value.

11. The system of claim 7, identifying the second plurality of wells in the new data set comprises:
identifying in the new data set one or more values that comprise an r-squared value, a variance value, and a standard error value.

12. The system of claim 7, wherein classifying the one or more decline curves comprises:
partitioning the classified one or more decline curves into separate production profiles based on a respective play.

13. A non-transitory computer readable medium having instructions stored thereon, which, when executed by a processor, cause the processor to perform a method, comprising:
receiving, from a remote computing device, a set of production information for a plurality of plays from a region, the set of production information directed to past production of a plurality of wells;
generating, by a computing system, an input data set based on the set of production information;
identifying, by the computing system, a first portion of the input data set comprising a first plurality of wells that requires correction by fitting one or more decline curves to the input data set, wherein each well of the first plurality of wells comprises a month of production data that misreported;
consolidating, by the computing system, the one or more decline curves into a new data set;
classifying, by the computing system, the one or more decline curves by identifying a second plurality of wells in the new data set, the second plurality of wells comprising a threshold amount of production information, the classifying comprising:
identifying a second portion of the input data set that does not require correction, the second portion of the input data set comprising the second plurality of wells,
generating an interpolated map residual from the new data set based on control points of the second plurality of wells,
generating a kernel density heat map from the new data set, the kernel density heat map representing a density of the production data within a region of the second plurality of wells based on the control points,
generating a decline profile for the set of production information based on the interpolated map residual and the kernel density heat map,
imputing values for each month of the production data that misreported based on the decline profile, and
classifying the one or more decline curves based on the imputed values;
forecasting, by the computing system, future oil or gas production of the plurality of wells based on the classified one or more decline curves; and
delivering, by the computing system, the forecasted future oil or gas production of the plurality of wells to the remote computing device.

14. The non-transitory computer readable medium of claim 13, wherein generating, by the computing system, the input data set comprises:
consolidating the set of production information for the plurality of plays into a single data set.

15. The non-transitory computer readable medium of claim 14, further comprising:
identifying one or more missing days of data in the single data set;
generating a production value for each of the identified one or more missing days of data; and
imputing each production value in each respective missing day of data.

16. The non-transitory computer readable medium of claim 13, wherein fitting, by the computing system, the one or more decline curves to the input data set comprises:

generating a confidence interval to identify the second portion of the input data set that exceeds the threshold amount of production value.

17. The non-transitory computer readable medium of claim 13, identifying the second plurality of wells in the new data set comprises:
identifying in the new data set one or more values that comprise an r-squared value, a variance value, and a standard error value.

* * * * *